(12) United States Patent
Manabe et al.

(10) Patent No.: US 9,958,005 B2
(45) Date of Patent: May 1, 2018

(54) OIL-LUBRICATED BEARING DEVICE AND VACUUM PUMP

(71) Applicant: Shimadzu Corporation, Kyoto (JP)

(72) Inventors: Masashi Manabe, Kyoto (JP); Hidefumi Saito, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days. days.

(21) Appl. No.: 15/277,008

(22) Filed: Sep. 27, 2016

(65) Prior Publication Data

US 2017/0102034 A1 Apr. 13, 2017

(30) Foreign Application Priority Data

Oct. 13, 2015 (JP) .................................. 2015-202379
Jul. 27, 2016 (JP) .................................. 2016-147412

(51) Int. Cl.
*F16C 33/66* (2006.01)
*F16C 33/38* (2006.01)
(Continued)

(52) U.S. Cl.
CPC .......... *F16C 19/16* (2013.01); *F16C 32/0408* (2013.01); *F16C 33/3887* (2013.01);
(Continued)

(58) Field of Classification Search
CPC ...... F16C 19/16; F16C 33/412; F16C 33/414; F16C 33/6651; F16C 33/6681; F16C 2300/22; F16C 2360/45; F16C 33/3862; F16C 33/6648; F16C 33/6611; F16C 33/59; F16C 33/58; B23Q 11/12; F16N 7/14; F16N 7/38; F04B 43/043
(Continued)

(56) References Cited

U.S. PATENT DOCUMENTS 4,181,379 A * 1/1980 Letts .................... F16C 33/6648
384/465
4,286,829 A * 9/1981 Heemskerk ........... F16C 19/163
384/469
(Continued)

FOREIGN PATENT DOCUMENTS

DE 102014224209 A1 * 6/2016 .............. F16C 33/66
JP 3-089994 U 9/1991
(Continued)

*Primary Examiner* — Marcus Charles
(74) *Attorney, Agent, or Firm* — Renner, Otto, Boissell & Sklar, LLP

(57) ABSTRACT

An oil-lubricated bearing device comprises: a rolling bearing including an inner ring, an outer ring, rolling bodies, and a holder; a tapered member; a lubricant storage disposed on a side provided with the tapered member with respect to the inner ring; and a contact portion. The holder includes pockets each formed with outer and inner ring side openings and configured to hold a corresponding one of the rolling bodies, a lubricant scraping portion formed at an inner peripheral surface of each of the pockets and configured to scrape lubricant adhering to a surface of each of the rolling body, and a second inclined surface formed at an outer peripheral surface portion of the holder adjacent to the outer ring side opening and rising with a slope toward the lubricant storage.

11 Claims, 16 Drawing Sheets

(51) Int. Cl.
  *F16C 19/16* (2006.01)
  *F16N 7/14* (2006.01)
  *F16N 7/38* (2006.01)
  *F16C 32/04* (2006.01)
  *F16C 33/41* (2006.01)

(52) U.S. Cl.
  CPC .......... *F16C 33/412* (2013.01); *F16C 33/414* (2013.01); *F16C 33/6651* (2013.01); *F16C 33/6659* (2013.01); *F16C 33/6681* (2013.01); *F16N 7/14* (2013.01); *F16N 7/38* (2013.01); *F16C 2300/22* (2013.01); *F16C 2360/45* (2013.01)

(58) Field of Classification Search
  USPC ........ 384/462, 470, 473–474, 531, 569, 465
  See application file for complete search history.

(56) References Cited

U.S. PATENT DOCUMENTS

| | | | | |
|---|---|---|---|---|
| 4,576,489 A | * | 3/1986 | Bentele | F16C 33/664 384/469 |
| 6,733,181 B2 | * | 5/2004 | Koiwa | F16C 33/6662 384/465 |
| 8,202,005 B2 | * | 6/2012 | Koch | F04D 19/042 384/465 |
| 8,439,570 B2 | * | 5/2013 | Urano | F16J 15/162 384/473 |
| 8,529,134 B2 | * | 9/2013 | Sekimoto | F16C 33/3843 384/465 |
| 9,004,772 B2 | * | 4/2015 | Tanimoto | F16C 33/6614 384/473 |
| 2002/0009245 A1 | * | 1/2002 | Sugita | F16C 33/6659 384/466 |
| 2012/0301065 A1 | * | 11/2012 | Mori | F16C 33/6607 384/469 |
| 2014/0226929 A1 | * | 8/2014 | Katsuno | F16C 33/3856 384/531 |
| 2014/0248015 A1 | * | 9/2014 | Yamamoto | F16C 33/664 384/471 |
| 2014/0314360 A1 | * | 10/2014 | Misada | F16C 33/6655 384/473 |

FOREIGN PATENT DOCUMENTS

| | | | | | |
|---|---|---|---|---|---|
| JP | 2005003145 A | * | 1/2005 | ............ | F16C 33/414 |
| JP | 2009-191876 A | | 8/2009 | | |
| JP | 2011169362 A | * | 9/2011 | ............... | F16N 7/12 |
| JP | 2012021581 A | * | 2/2012 | ............ | B23Q 11/12 |
| JP | 2012225459 A | * | 11/2012 | ............... | F16C 33/66 |
| JP | 2012255517 A | * | 12/2012 | ............... | F16N 7/14 |
| JP | 2013068279 A | * | 4/2013 | ............ | F16C 19/16 |
| JP | 2013104520 A | * | 5/2013 | ............ | F16C 19/06 |
| JP | 2013104529 A | * | 5/2013 | ............. | F16C 33/58 |
| JP | 5303137 B2 | | 6/2013 | | |
| JP | 2013137109 A | * | 7/2013 | ............. | F16C 33/66 |
| RU | 2104419 C1 | * | 2/1998 | | |
| WO | WO-2016052596 A1 | * | 4/2016 | ............. | F16C 19/04 |

\* cited by examiner

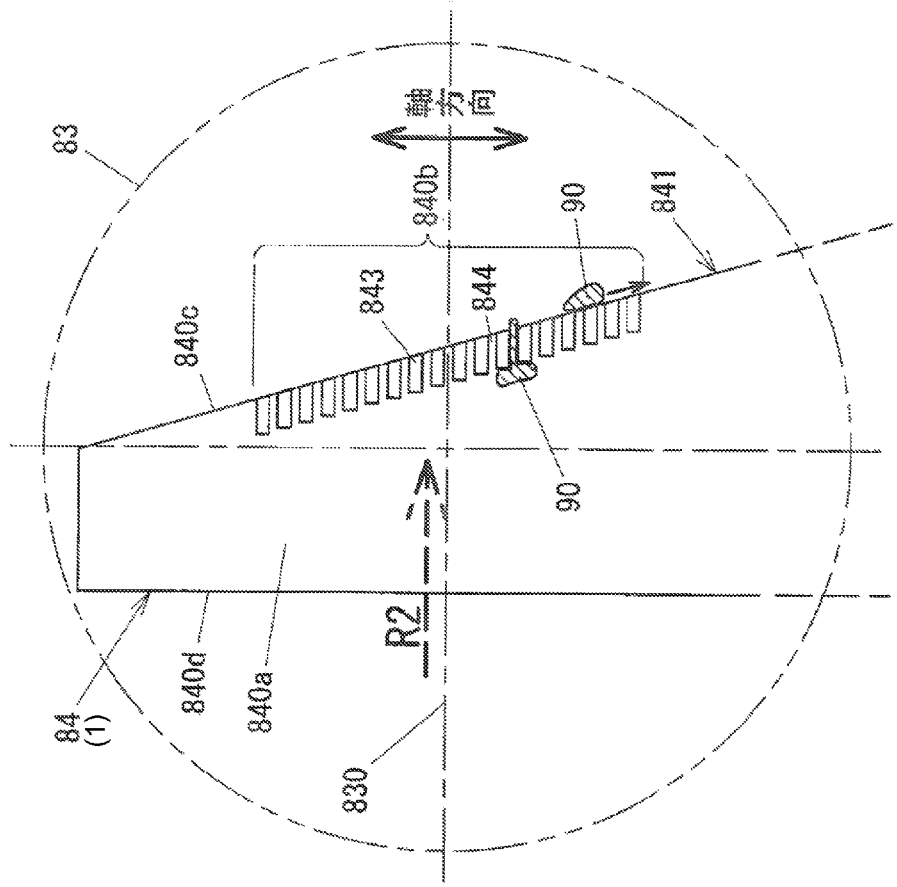
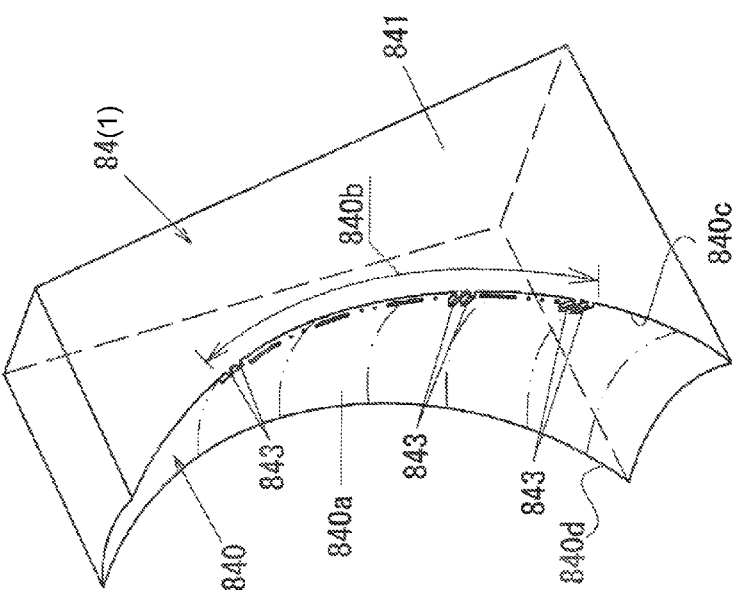

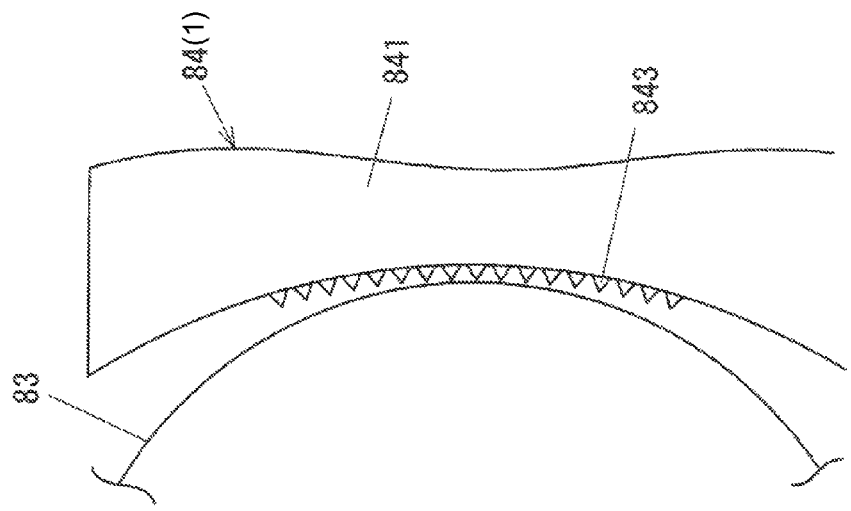
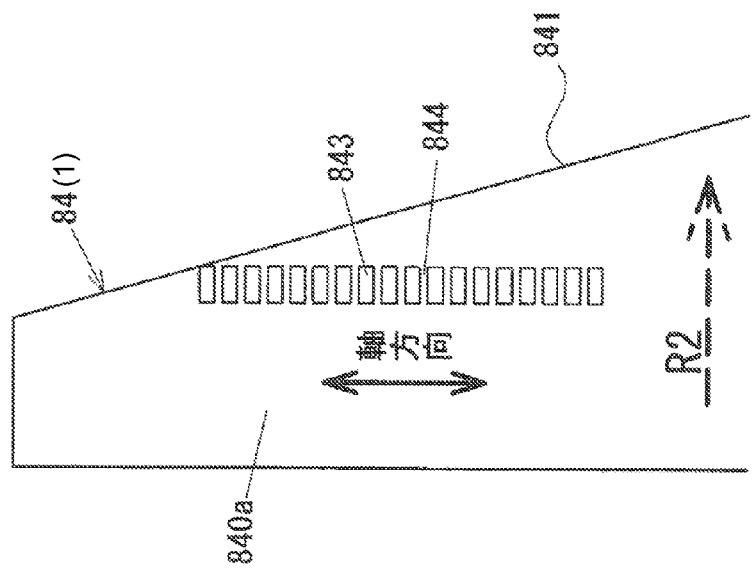

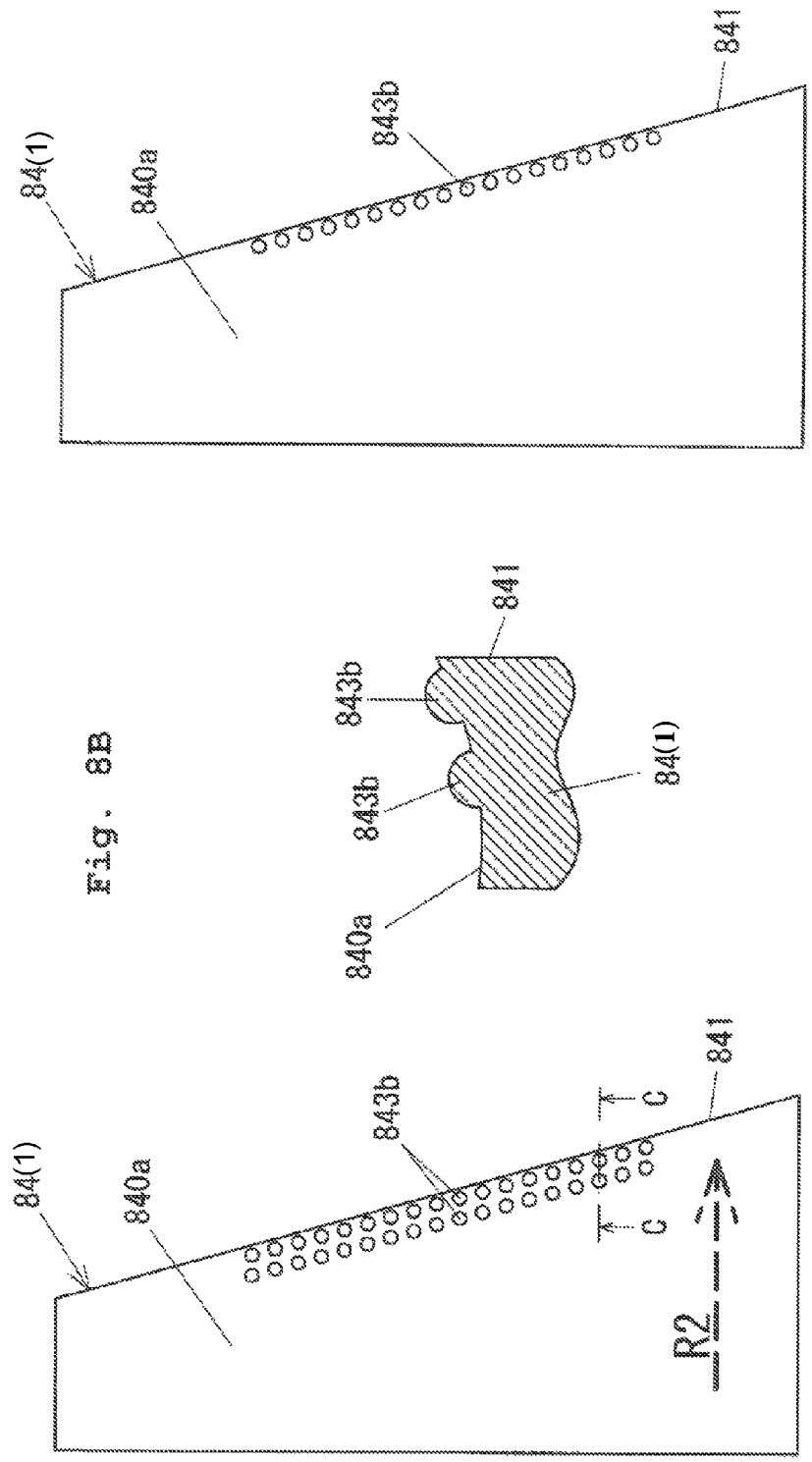

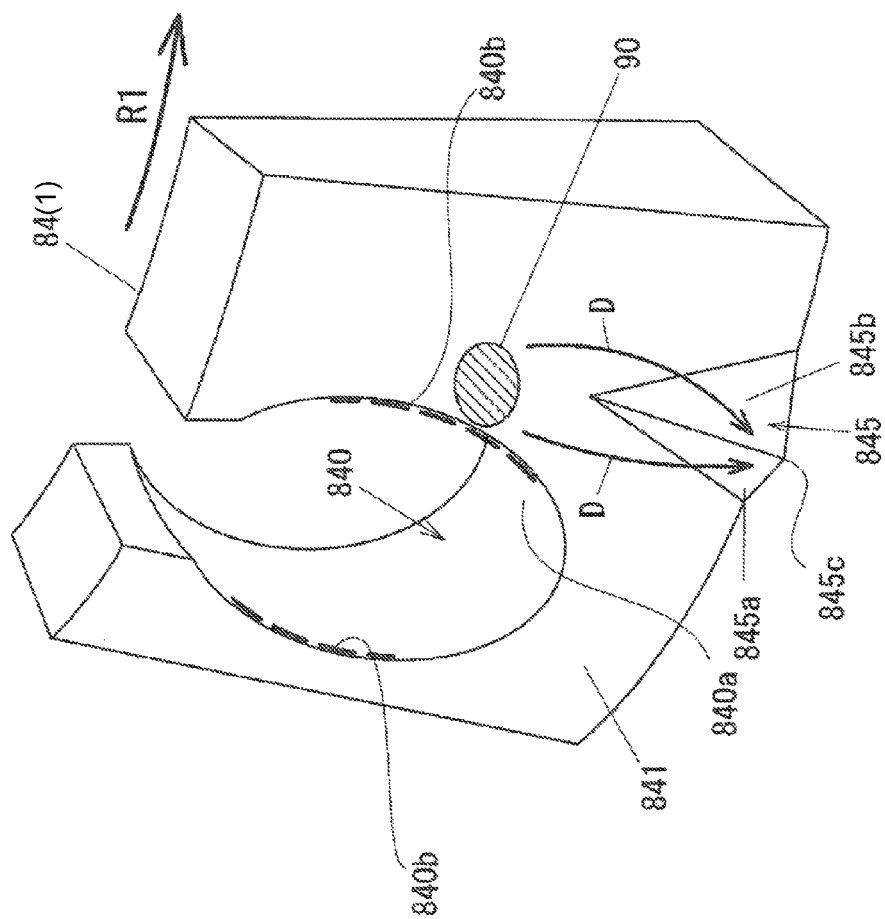

OIL-LUBRICATED BEARING DEVICE AND VACUUM PUMP

BACKGROUND OF THE INVENTION

1. Technical Field

The present invention relates to an oil-lubricated bearing device and a vacuum pump.

2. Background Art

It has been demanded for a rolling bearing for high-speed rotation to maintain lubrication of a rolling surface by repeated supply of a slight amount of lubricant and to prevent lubricant more than necessary from adhering to the rolling surface. When the lubricant more than necessary for lubrication adheres to the rolling surface, agitation resistance of the lubricant is caused, leading to heat generation.

The method described in Patent Literature 1 (U.S. Pat. No. 5,303,137) has been proposed as the method for lubricating a rolling bearing in a vacuum pump. The following structure is employed for the rolling bearing described in Patent Literature 1: a tapered conical member is provided at a shaft rotating together with an inner ring, and a felt member provided at a lubricant storage device contacts the tapered conical surface to supply lubricant to the inner ring by centrifugal force. In this structure, the lubricant is supplied from a rolling surface (also referred to as a "raceway surface") of the inner ring to a rolling surface of an outer ring via rolling bodies (balls), and extra lubricant having overflowed from the rolling surface of the outer ring returns to the lubricant storage device.

However, since it is configured such that the extra lubricant having overflowed from the rolling surface returns to the lubricant storage device, lubricant more than necessary for lubrication is present on the rolling surface in the case of lubricant overflowing. For this reason, generation of agitation resistance cannot be avoided.

SUMMARY OF THE INVENTION

An oil-lubricated bearing device comprises: a rolling bearing including an inner ring, an outer ring, rolling bodies, and a holder configured to maintain a gap between adjacent ones of the rolling bodies, and configured to support a rotor shaft; a tapered member provided at the rotor shaft to which the inner ring is fixed and formed with a first inclined surface rising with a slope toward the inner ring; a lubricant storage disposed on a side provided with the tapered member with respect to the inner ring; and a contact portion configured to contact the first inclined surface to supply lubricant of the lubricant storage to the first inclined surface. The holder includes pockets each formed with outer and inner ring side openings and configured to hold a corresponding one of the rolling bodies, a lubricant scraping portion formed at an inner peripheral surface of each of the pockets and configured to scrape lubricant adhering to a surface of each of the rolling body, and a second inclined surface formed at an outer peripheral surface portion of the holder adjacent to the outer ring side opening and rising with a slope toward the lubricant storage.

The lubricant scraping portion includes a plurality of raised portions formed in a circumferential direction of the inner peripheral surface of each of the pocket in a region close to the outer ring side opening such that the plurality of raised portions are aligned.

The second inclined surface is formed with a protrusion protruding from the second inclined surface.

The tapered member is an inner ring fixing member detachably provided at the rotor shaft and configured to fix the inner ring to the rotor shaft.

The oil-lubricated bearing device, further comprises: a lubricant guide portion disposed closer to the outer ring with respect to the holder to contact the lubricant storage and the outer ring and configured to guide lubricant scattered from the second inclined surface to the lubricant storage.

An oil-lubricated bearing device comprises: a rolling bearing including an inner ring, an outer ring, rolling bodies, and a holder configured to maintain a gap between adjacent ones of the rolling bodies, and configured to support a rotor shaft; a tapered member provided at the rotor shaft to which the inner ring is fixed and formed with a first inclined surface rising with a slope toward the inner ring; a lubricant storage disposed on a side provided with the tapered member with respect to the inner ring; and a contact portion configured to contact the first inclined surface to supply lubricant of the lubricant storage to the first inclined surface. The holder includes pockets each penetrating from an inner peripheral holder surface to an outer peripheral holder surface and configured to hold a corresponding one of the rolling bodies, a second inclined surface formed by the outer peripheral holder surface and rising with a slope such that a distance from a center axis increases toward the lubricant storage, a third inclined surface formed by the inner peripheral holder surface and falling with a slope such that a distance from the center axis increases with distance from the lubricant storage, and a connection surface formed at a holder end portion opposite to the lubricant storage and connecting between the second and third inclined surfaces.

The second inclined surface is formed with a protrusion formed in a ridge shape to extend from a side of the connection surface toward the lubricant storage through a portion between adjacent two of the pockets.

At least one of the pockets penetrates from an inner ring side opening with surroundings thereof closed to an outer ring side opening with surroundings thereof closed.

The holder is configured such that two or more members are integrally coupled together.

A vacuum pump comprises: the oil-lubricated bearing device; and a pump rotor provided with the rotor shaft.

BRIEF DESCRIPTION OF THE DRAWINGS

FIGS. 6A and 6B are views of a specific example of the shape of a scraping portion;

FIGS. 7A and 7B are views of variations of the scraping portion;

FIGS. 8A to 8C are views of a third variation of the scraping portion;

FIG. 9 is a view of a protrusion formed on a tapered surface;

DETAILED DESCRIPTION OF THE EXEMPLARY EMBODIMENTS

Figure 1:
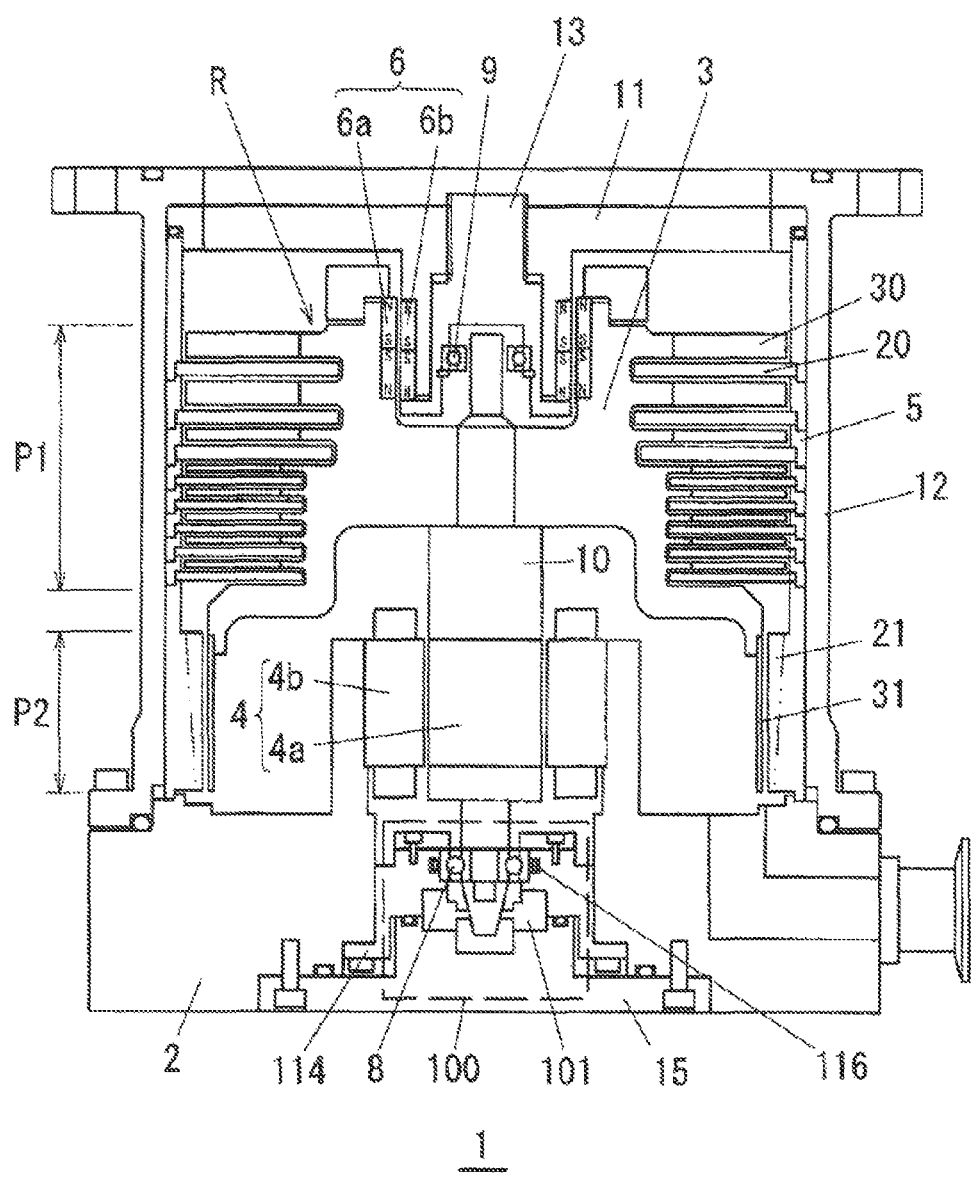
FIG. 1 is a cross-sectional view of a turbo-molecular pump equipped with an oil-lubricated bearing device of an embodiment of the present invention.

Hereinafter, an embodiment of the present invention will be described with reference to drawings. FIG. 1 is a view of an oil-lubricated bearing device of an embodiment of the present invention, and is a cross-sectional view of a turbo-molecular pump 1 equipped with the oil-lubricated bearing device. Note that a power supply unit configured to supply power is connected to the turbo-molecular pump 1, but is not shown in FIG. 1.

The turbo-molecular pump 1 illustrated in FIG. 1 includes, as exhaust functions, a turbo pump portion P1 including turbine blades, and a Holweck pump portion P2 including a spiral groove. Needless to say, the present invention is applicable not only to the vacuum pump including the turbo pump portion P1 and the Holweck pump portion P2 as the exhaust functions, but also to a vacuum pump including only turbine blades, a vacuum pump including only a drag pump such as a Siegbahn pump or a Holweck pump, or a combination thereof.

The turbo pump portion P1 includes a plurality of rotor blades 30 formed at a pump rotor 3, and a plurality of stationary blades 20 arranged on the side of a base 2. On the other hand, the Holweck pump portion P2 provided on the exhaust downstream side of the turbo pump portion P1 includes a cylindrical portion 31 formed at the pump rotor 3, and a stator 21 disposed on the side of the base 2. The inner peripheral surface of the cylindrical stator 21 is formed with the spiral groove. The plurality of rotor blades 30 and the cylindrical portion 31 form a rotary side exhaust function, and the plurality of stationary blades 20 and the stator 21 form a stationary side exhaust function.

The pump rotor 3 is fastened to a shaft 10, and the shaft 10 is rotatably driven by a motor 4. For example, a DC brushless motor is used as the motor 4. A motor stator 4a is provided at the base 2, and a motor rotor 4b is provided at the shaft 10. A rotor unit R formed of the shaft 10 and the pump rotor 3 is rotatably supported by a permanent magnet magnetic bearing 6 using permanent magnets 6a, 6b and a ball bearing 8 as a rolling bearing.

Each permanent magnet 6a, 6b is a ring-shaped permanent magnet magnetized in an axial direction. The permanent magnets 6a provided at the pump rotor 3 are arranged in the axial direction such that the polarities of opposing ones of the permanent magnets 6a are the same as each other. On the other hand, the stationary side permanent magnets 6b are attached to a magnet holder 11 fixed to a pump case 12. These permanent magnets 6b are also arranged in the axial direction such that the polarities of opposing ones of the permanent magnets 6b are the same as each other. The axial position of each permanent magnet 6a provided at the pump rotor 3 is set slightly higher than the position of a corresponding one of the permanent magnets 6b arranged at the inner peripheral side of the permanent magnet 6a. That is, the magnetic pole of the rotary side permanent magnet shifts, in the axial direction, from the magnetic pole of the stationary side permanent magnet by a predetermined degree. The supporting force of the permanent magnet magnetic bearing 6 varies according to such a predetermined degree. In the example illustrated in FIG. 1, since each permanent magnet 6a is disposed higher as viewed in FIG. 1, the reactive force between the permanent magnet 6a and the permanent magnet 6b causes radial supporting force and upward axial force (force toward a pump exhaust port) to act on the rotor unit R.

A bearing holder 13 configured to hold a ball bearing 9 is fixed to the center of the magnet holder 11. In FIG. 1, deep groove ball bearings are used as the ball bearings 8, 9, but the present invention is not limited to these bearings. For example, angular contact bearings may be used. The ball bearing 9 functions as a touchdown bearing configured to restrict radial vibration of an upper shaft portion. The shaft 10 and the ball bearing 9 do not contact each other in a steady rotation state, and the shaft 10 comes into contact with the ball bearing 9 when great disturbance is applied or when whirling of the shaft 10 becomes greater due to acceleration or deceleration of rotation.

The ball bearing 8 is held by a bearing holder 114 bolted to the base 2. The outer peripheral side of the ball bearing 8 is provided with a ring-shaped radial damper 116. Elastomer such as rubber is used as the material of the radial damper 116. The ball bearing 8 is an oil-lubricated rolling bearing, and includes a wick 101 as a lubricant storage for supplying lubricant to the ball bearing 8. The wick 101 is held between the bearing holder 114 and a lower lid 15.

Figure 2:
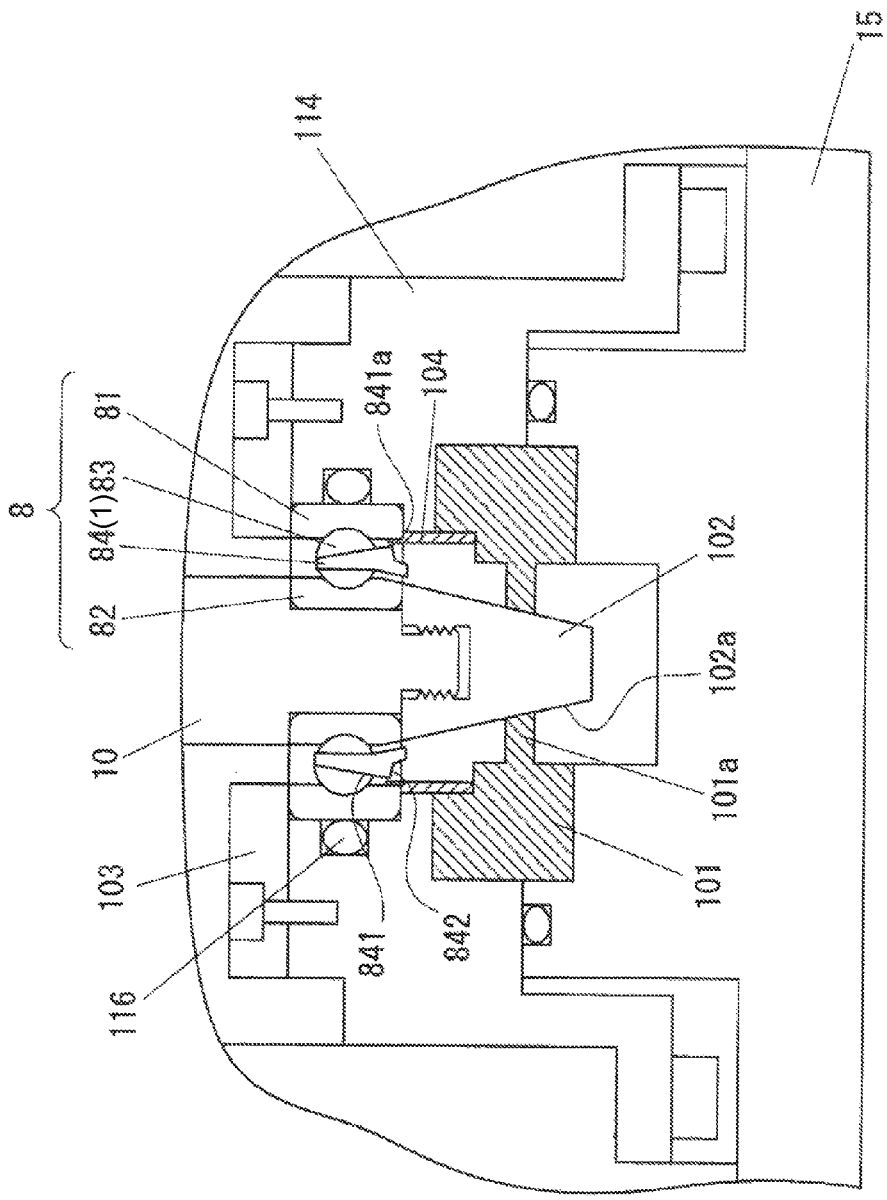
FIG. 2 is an enlarged partial view of the oil-lubricated bearing device.

FIG. 2 is an enlarged partial view of an oil-lubricated bearing device 100 including the ball bearing 8, the wick 101, etc. An inner ring 82 of the ball bearing 8 is fixed to the shaft 10 by a conical nut 102 functioning as a tapered member. The conical nut 102 is detachably provided at the lower end of the shaft 10, the lower end being formed with an external thread. An outer ring 81 of the ball bearing 8 is fixed to the bearing holder 114 by a bearing weight 103. Rolling bodies 83 are held by a holder 84(1).

The outer peripheral surface of the conical nut 102 forms a tapered surface 102a pointed from the side of the conical nut 102 contacting the inner ring 82 of the ball bearing 8 toward the tip end of the conical nut 102. That is, the tapered surface 102a is an inclined surface rising with a slope toward the inner ring 82. The inner peripheral surface of the ring-shaped wick 101 is formed with an inwardly-protruding contact portion 101a, and the contact portion 101a contacts the tapered surface 102a of the conical nut 102. The wick 101 is formed of a felt or sponge member being able to hold lubricant, and is configured to hold lubricant. A cylindrical tube member 104 is provided between the outer ring 81 of the ball bearing 8 and the wick 101 to contact these components. The cylindrical tube member 104 is a member configured to use capillary phenomenon to transfer lubricant from the outer ring 81 to the wick 101. For example, a member formed such that a porous body is provided on the inner peripheral surface of the cylindrical tube, a fibrous member such as felt, or a member made of a porous material such as sponge or sintered metal may be used.

Figure 3:
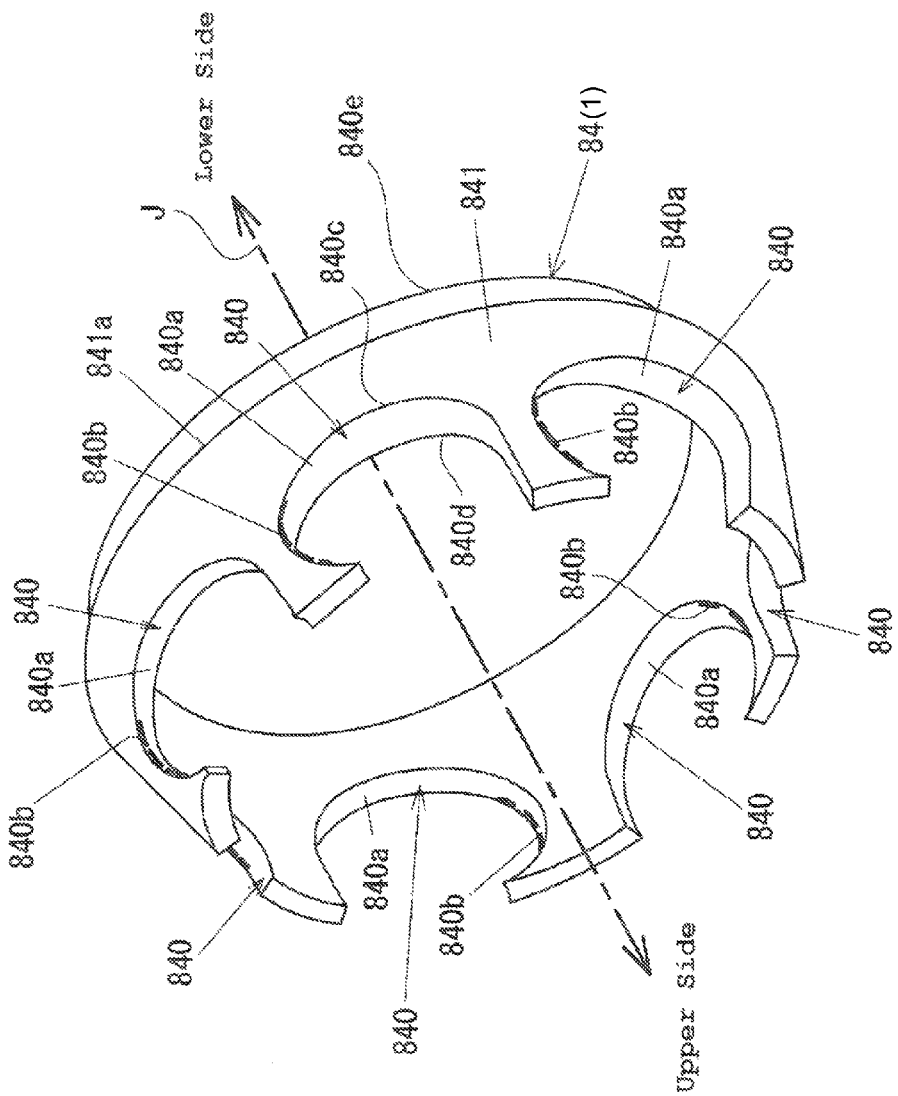
FIG. 3 is a perspective view of the outer shape of a holder.

FIG. 3 is a perspective view of the outer shape of the holder 84(1). The holder 84(1) is formed with a plurality of pockets 840 each configured to hold a corresponding one of the rolling bodies 83. The holder 84(1) illustrated in FIG. 3 is a crown-shaped holder, and each pocket 840 is such a through-hole that an upper portion of the holder 84(1) in the axial direction partially opens. Note that the crown-shaped holder will be described as an example in the present embodiment, but the present invention is not limited to the holder in such a shape.

At the outer peripheral surface of the holder 84(1), a tapered surface 841 is formed adjacent to an outer ring side opening 840c of each pocket 840. As illustrated in the cross-sectional view of FIG. 2, the tapered surface 841 inclines farther from the center axis of the holder 84(1) toward the lubricant storage (a wick 101) side end 84a of the holder 84(1). That is, the tapered surface 841 is formed by a holder outer peripheral surface portion adjacent to the outer ring side opening 840c, and is an inclined surface rising with a slope toward the wick 101. An outer peripheral surface portion of the holder 84(1) below the lower end 841a of the tapered surface 841 forms a tapered surface 842 where the radius of the holder 84(1) is reduced, and the outer diameter of the holder 84(1) is the maximum at the lower end 841a of the tapered surface 841.

The inner peripheral surface 840a of each pocket 840 is formed with a scraping portion 840b configured to scrape lubricant adhering to the surface of the rolling body 83. Note that the scraping portion 840b is in a minute raised-recessed shape, and in FIG. 3, the region formed with the scraping portion 840b is indicated by a dashed line (the same applies to the later-described case of FIG. 4). The specific shape of the scraping portion 840b will be described later.

Figure 4A:
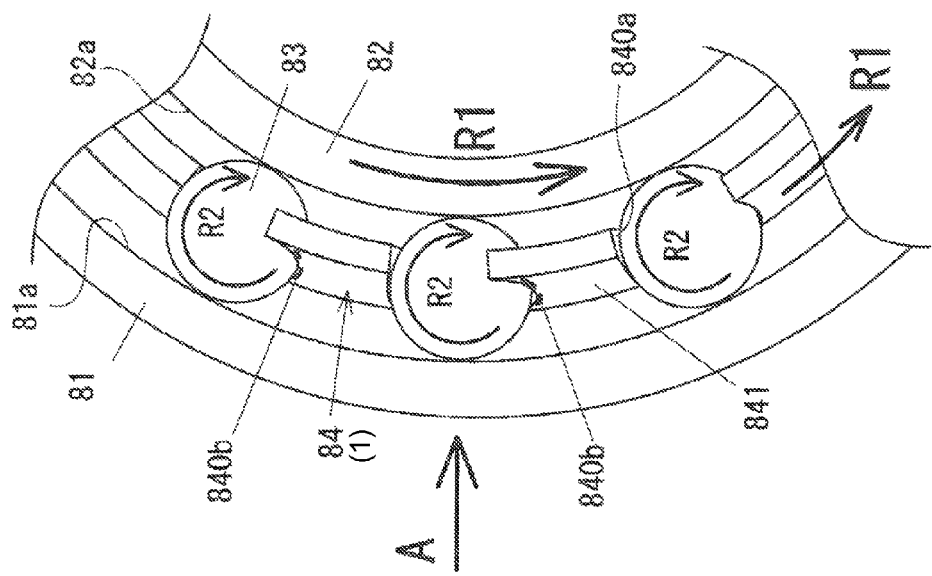
FIGS. 4A and 4B are views for describing movement of rolling bodies and the holder.
Figure 4B:
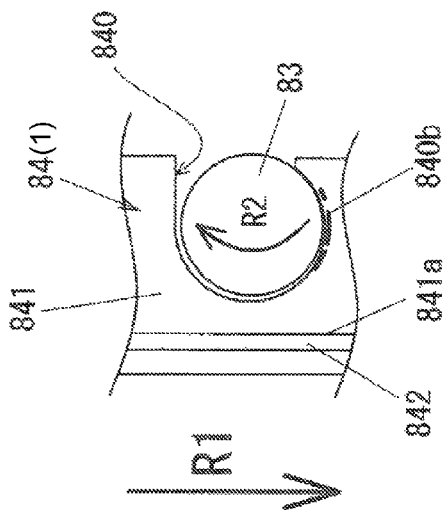

FIGS. 4A and 4B are views for describing movement of the rolling bodies 83 and the holder 84(1) while the ball bearing 8 is rotating. FIG. 4A is a plan view, and FIG. 4B is a view from an arrow A. Each rolling body 83 contacts a rolling surface 82a of the inner ring 82 and a rolling surface 81a of the outer ring 81. When the inner ring 82 rotates counterclockwise as indicated by an arrow R1, each rolling body 83 orbits counterclockwise while rotating clockwise. While each rolling body 83 is orbiting counterclockwise, the holder 84(1) also rotates counterclockwise such that each rolling body 83 pushes the holder 84(1). The scraping portion 840b formed at the inner peripheral surface 840a of each pocket 840 is formed on the orbit direction side at the inner peripheral surface 840a. As in the case of FIG. 3, the region formed with the scraping portion 840b is also indicated by a dashed line with a reference numeral "840b" in FIG. 4.

As described above, each rolling body 83 orbiting in the R1 direction rotates in an R2 direction while contacting the inner peripheral surface 840a of the holder 84(1) on the side formed with the scraping portion 840b. Thus, part of lubricant adhering to the surface of the rolling body 83 is scraped by the scraping portion 840b. Since the holder 84(1) rotates in the R1 direction at high speed, the centrifugal force acts on the scraped lubricant, and such lubricant moves toward the outer peripheral side through the gap between the rolling body 83 and the inner peripheral surface 840a of the holder 84(1). Note that the holder 84(1) rotates in the R1 direction at the half of the angular velocity of the inner ring 82. As long as each rolling body 83 rotates not by sliding but by rolling, the angular velocity of the rolling body 83 at the inner ring contact point thereof is the same as that of the shaft (the shaft 10), and the angular velocity of the rolling body 83 at the outer ring contact point thereof is zero. Thus, the orbiting speed at the center of the rolling body between the inner and outer ring contact points is the half of the angular velocity of the inner ring 82.

Figure 5:
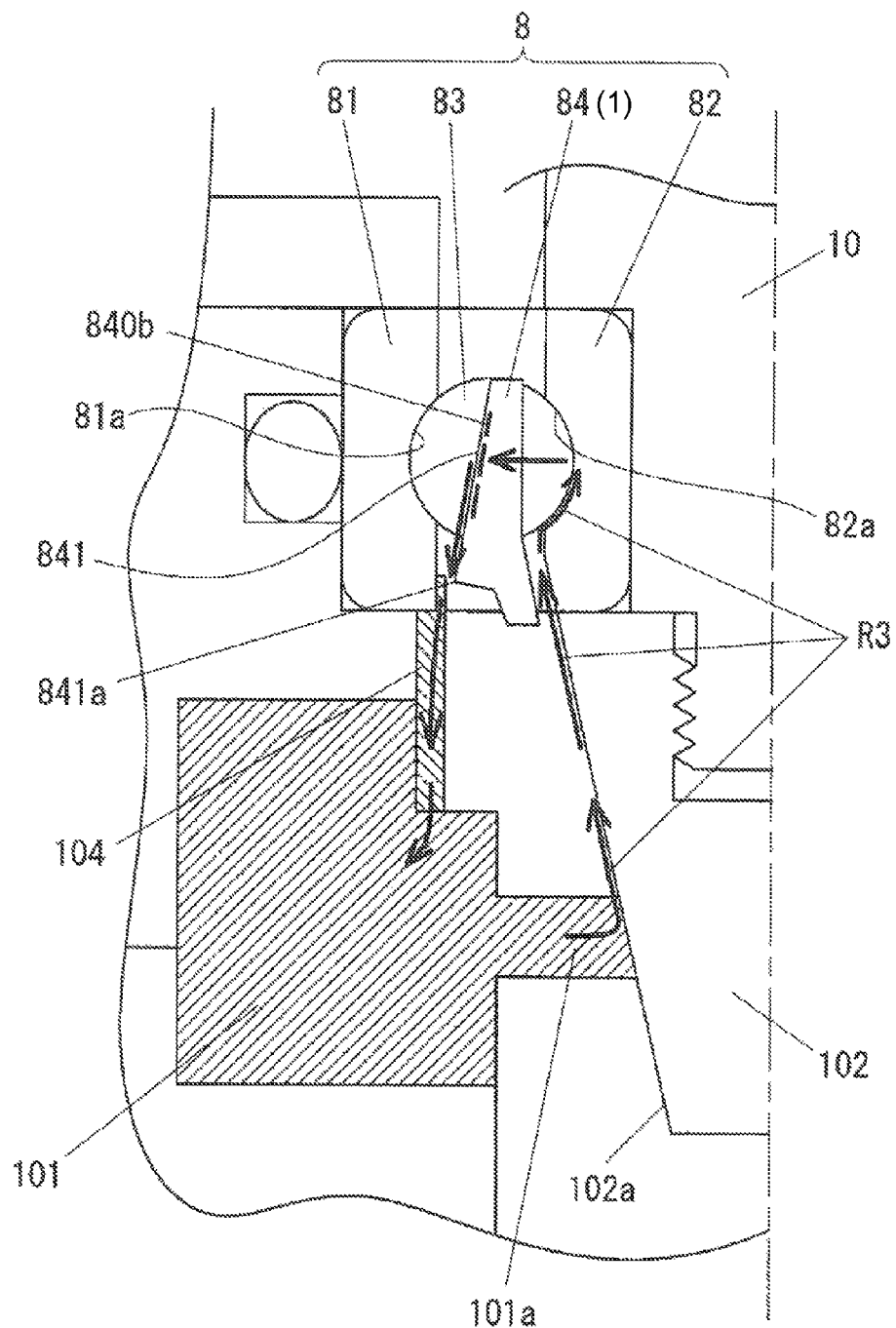
FIG. 5 is a view for describing a lubricant circulation path.

FIG. 5 is a view for describing a lubricant circulation path. Arrows R3 indicate a lubricant movement path (the lubricant circulation path). As described above, lubricant is stored in the wick 101. The contact portion 101a formed at the wick 101 contacts the tapered surface 102a of the conical nut 102, and therefore, the lubricant of the contact portion 101a adheres to the tapered surface 102a. The tapered surface 102a is the tapered surface where the diameter of the conical nut 102 increases from the tip end of the conical nut 102 toward the inner ring 82, i.e., the tapered surface rising with the slope toward the inner ring 82. Thus, when the conical nut 102 and the shaft 10 together rotate at high speed, the lubricant on the tapered surface 102a moves, by action of the centrifugal force, toward the greater diameter side. That is, the lubricant moves toward the inner ring 82 along the tapered surface 102a as indicated by the arrows R3.

The lubricant having moved from the tapered surface 102a to the inner ring 82 moves onto the rolling surface 82a of the inner ring 82 to lubricate the rolling surface 82a and to adhere to each rolling body 83. While each rolling body 83 to which the lubricant adheres is rotating, part of the lubricant adhering to the rolling body 83 is, as described above, scraped by the scraping portion 840b formed at the holder 84(1). When the scraped lubricant moves to the tapered surface 841 formed on the outer peripheral side of the holder 84(1), the centrifugal force moves such lubricant on the tapered surface 841 toward the greater-diameter lower side (the wick side) as illustrated in the figure. When the lubricant having moved downward on the tapered surface 841 reaches the lower end 841a, the lubricant is scattered by the centrifugal force to adhere to the inner peripheral surface of the outer ring 81 or the cylindrical tube member 104.

As described above, since the cylindrical tube member 104 is the member configured to use the capillary phenomenon to guide, to the wick 101, the lubricant scattered toward the inner peripheral surface of the outer ring 81 or the surface of the cylindrical tube member 104, the lubricant scattered from the holder 84(1) can be returned to the wick 101 regardless of the attachment orientation of the turbomolecular pump 1. In the above-described manner, lubricant is supplied from the wick 101 to the ball bearing 8, and then, is collected from the ball bearing 8 by the wick 101.

In the case of a typical holder including no scraping portion 840b, lubricant supplied to a rolling surface 82a of an inner ring 82 moves to a rolling surface 81a of an outer ring 81 by rotation of rolling bodies 83. Moreover, lubricant on the rolling surface 81a of the outer ring 81 also adheres to the rotating rolling bodies 83 to move toward the inner ring side. However, since the inner ring 82 of a ball bearing 8 and a holder 84(1) are rotating at high speed, the lubricant tends to be accumulated on the outer ring side due to the centrifugal force acting on the lubricant. As a result, the lubricant tends to be excessive on the rolling surface 81a of the outer ring 81, leading to heat generation due to agitation resistance.

On the other hand, in the present embodiment, when the amount of lubricant adhering to each rolling body 83 increases and the thickness of the lubricant film formed on the surface of each rolling body 83 increases, part of such lubricant is accordingly scraped by the scraping portion 840b. Thus, an excessive increase in lubricant on the rolling surface 81a of the outer ring 81 can be suppressed, and therefore, the agitation resistance can be reduced.

Moreover, since the tapered surface 841 in the shape expanding toward the wick side (i.e., the shape with the rising slope toward the wick side) is formed by the outer peripheral surface of the holder 84(1), the lubricant scraped by each scraping portion 840b moves, by action of the centrifugal force, on the tapered surface 841 toward the wick side. The lubricant having moved to the wick side is scattered from the lower end 841a of the tapered surface 841, and eventually, is collected by the wick 101.

(Specific Shapes of Scraping Portion 840b)

FIGS. 6A and 6B are views of a specific example of the shape of the scraping portion 840b. FIG. 6A illustrates part of the holder 84(1), i.e., part of the pocket 840 formed with the scraping portion 840b. FIG. 6B illustrates that the inner peripheral surface 840a formed with the scraping portion 840b is unfolded into a planer shape. A circle indicated by a chain double-dashed line represents the rolling body 83. The inner peripheral surface 840a of the pocket 840 curves along the spherical surface of the rolling body 83, but such a curved inner peripheral surface 840a is two-dimensionally illustrated in FIG. 6B.

In the example illustrated in FIGS. 6A and 6B, the scraping portion 840b is configured such that plural elongated raised portions 843 having a rectangular cross section are arranged apart from each other in the circumferential direction of the inner peripheral surface 840a. Note that in FIG. 6A, some of the raised portions 843 are not shown. The protruding direction (the longitudinal direction) of each raised portion 843 is substantially perpendicular to the axial direction of the holder 84(1). The raised portions 843 are arranged in the circumferential direction of the outer ring side opening 840c along the edge of the inner peripheral surface 840a. The rolling body 83 rotates in the direction perpendicular to the axial direction as indicated by a dashed arrow R2. A chain line indicated by a reference numeral "830" is the line of the rotating rolling body 83 corresponding to the so-called "equator." The moving speed of the rolling body surface in the rotation direction thereof is the highest in the vicinity of the equator, and decreases with an increase in the distance from the equator in the vertical direction. Thus, the raised portions 843 are arranged in the vertical direction with respect to the line 830 such that scraping of lubricant is effectively performed.

Lubricant 90 scraped by the raised portions 843 of the scraping portion 840b moves, by the viscous force between the rolling body surface and the lubricant 90 and the centrifugal force acting on the lubricant, toward the tapered surface 841 through the gap 844 between adjacent ones of the raised portions 843. The lubricant 90 having moved to the tapered surface 841 moves to the greater-diameter side (the lower side as viewed in the figure) of the tapered surface 841 by the centrifugal force. As illustrated in FIG. 5, the wick 101 is disposed on the lower side as viewed in the figure. Note that the groove depth of the gap 844 may be constant as illustrated in FIG. 6, but may be greater toward the tapered surface 841 so that the case of increasing the amount of lubricant to be scraped can be handled.

FIGS. 7A and 7B are views of variations of the scraping portion 840b illustrated in FIGS. 6A and 6B. In the configurations illustrated in FIGS. 6A and 6B, the raised portions 843 vertically arranged as viewed in the figure are arranged along the tapered surface 841 at the right end (the outer ring side opening 840c) of the inner peripheral surface 840a. On the other hand, in the first variation illustrated in FIG. 7A, the raised portions 843 are arranged along the axial direction of the holder 84(1). Note that when the distance between each raised portion 843 and the tapered surface 841 is extremely long, there is a high probability that lubricant having moved through each gap 844 to the right as viewed in the figure re-adheres to the rolling body 83 without adhering to the tapered surface 841. For this reason, the raised portions 843 are preferably arranged close to the tapered surface 841 as illustrated in FIGS. 6A and 6B.

FIG. 7B is the view of the second variation of the scraping portion 840b, and illustrates the case of the raised portions 843 having a triangular cross section. Note that strictly speaking, the rolling body 83 do not contact the inner peripheral surface 840a of the pocket 840 across the entire curved surface thereof, but normally contacts the inner peripheral surface 840a at an equator portion (a portion indicated by the reference numeral "830" in FIGS. 6A and 6B) of the rotating rolling body 83. Thus, in the case where the raised portions 843 are provided only in the region corresponding to the equator portion, when the rolling body 83 and the inner peripheral surface 840a move relative to each other in the axial direction (the vertical direction as viewed in the figure), scraping of lubricant by the raised portions 843 is insufficient. For this reason, in the present embodiment, the raised portions 843 are arranged not only at the center position corresponding to the equator portion but also in the regions vertically shifted from the center position.

FIGS. 8A to 8C illustrate a third variation of the scraping portion, and FIG. 8B is a cross-sectional view along a C-C line. In the third variation, hemispherical raised portions 843b are formed. In the example illustrated in the development view of FIG. 8A, the raised portions 843b arranged along the inner peripheral surface 840a are arranged in two lines in the rotation direction R2 of the rolling body 83. Note that the number of lines in the rotation direction R2 is not limited to two. The number of lines may be one as illustrated in FIG. 8C, or may be three or more.

Note that the shape of the scraping portion 840b is not limited to the configurations illustrated in FIGS. 6A to 8C, and various shapes may be employed.

According to the above-described embodiment, the following features and advantageous effects are obtained:

(1) The oil-lubricated bearing device 100 includes the conical nut 102 as the tapered member provided at the shaft 10 fixed to the inner ring 82 and formed with the tapered surface 102a rising with the slope toward the inner ring 82, the wick 101 disposed on the side provided with the conical nut 102 with respect to the inner ring 82, and the contact portion 101a configured to contact the tapered surface 102a to supply lubricant from the wick 101 to the tapered surface 102a. As illustrated in FIG. 3, the holder 84(1) includes the pockets 840 each formed with the outer and inner ring side openings 840c, 840d and configured to hold a corresponding one of the rolling bodies 83, the scraping portion 840b formed at the inner peripheral surface 840a of each pocket 840 and configured to scrape lubricant adhering to the surface of each rolling body 83, and the tapered surface 841 formed by the outer peripheral surface portion of the holder 84(1) adjacent to the outer ring side opening 840c and rising with the slope toward the wick 101.

Since the holder 84(1) is provided with the scraping portions 840b as described above, lubricant moving from each rolling body 83 toward the rolling surface 81a of the outer ring 81 can be reduced. As a result, this prevents excessive lubricant from being on the rolling surface 81a of the outer ring 81, and therefore, heat generation due to agitation resistance can be reduced. Particularly in a pump operating while a rotation speed changes according to an exhaust load, the amount of lubricant to be delivered by a conical nut 102 also changes. Thus, in the case of a design made to ensure a lubricant amount under any conditions, the delivery amount becomes more than necessary at the maximum rotation speed, and on the other hand, a temperature increase due to agitation resistance becomes noticeable. For these reasons, it is important for rotation maintaining to ensure the amount of lubricant to be scraped in the case of a high rotation speed. This is advantageous in the case of the high rotation speed because the number of contact of the rolling body 83 with the scraping portion 840b of the holder 84(1) also increases.

Moreover, since the tapered surface 841 rising with the slope toward the wick 101 is formed by the holder outer peripheral surface portion adjacent to the outer ring side opening 840c of each pocket 840, lubricant scraped by each scraping portion 840b to adhere to the tapered surface 841 moves toward the wick 101, and then, is scattered. As a result, lubricant exhausted from the ball bearing 8 as extra lubricant is collected by the wick 101, and therefore, a lubricant circulation system being able to supply and collect lubricant can be configured.

In the configuration made such that lubricant is, as in the device described in Patent Literature 1, exhausted not in the direction toward the lubricant storage, the path for returning the exhausted lubricant to the lubricant storage needs to be formed on a pump base side, leading to a complex configuration and a cost increase. However, in the above-described embodiment, lubricant scraped from the holder 84(1) formed with the scraping portion 840b is exhausted toward the lubricant storage (the wick 101), and therefore, no complex path needs to be formed on a pump base side.

Figure 10:
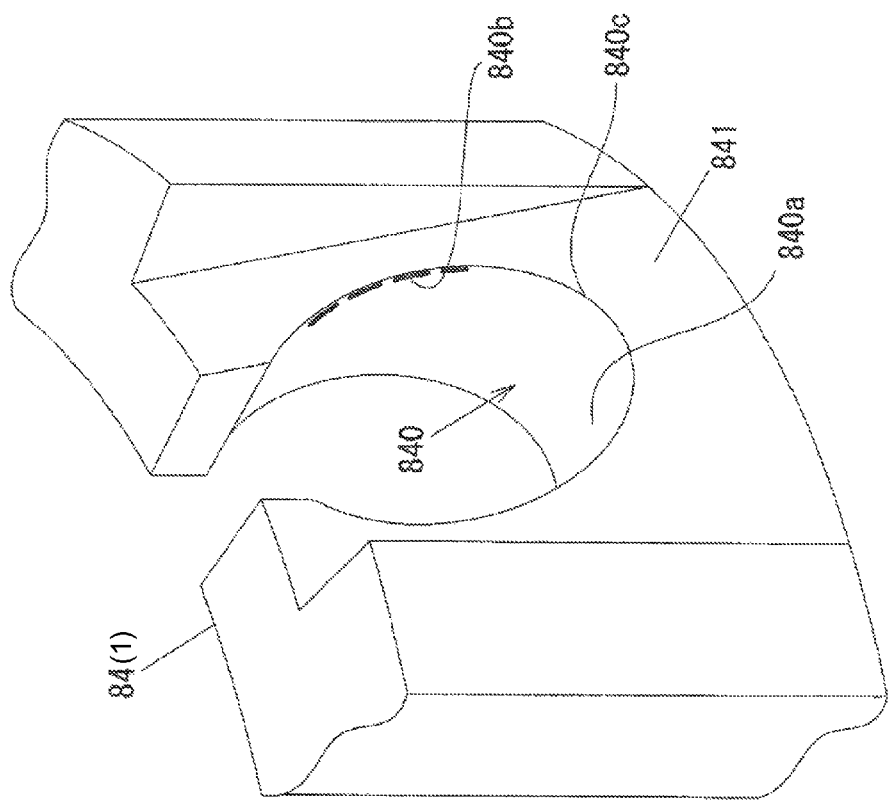
FIG. 10 is a view of another example of an inclined surface formed at the holder.

Note that in the holder 84(1) illustrated in FIG. 3, the tapered surface 841 is formed across the circumference of the outer peripheral surface of the holder 84(1). However, as illustrated in FIG. 10, only an outer peripheral surface portion adjacent to the outer ring side opening 840c of the pocket 840 may form the inclined surface (the tapered surface 841) rising with the slope toward the wick 101.

Moreover, in the example illustrated in FIG. 3, each scraping portion 840b is formed in the region of the inner peripheral surface 840a where the rotation direction R2 points from the inner ring side toward the outer ring side. This is because when the inner ring 82 rotates in the R1 direction as illustrated in FIG. 4B, each rolling body 83 normally abuts such a region. Note that when the inner ring 82 rotates in the R1 direction, each rolling body 83 does not always abut the side formed with the scraping portion 840b of FIG. 3, and there are some rolling bodies 83 orbiting relatively later than the holder 84(1). For this reason, the scraping portion 840b may be formed not only at the inner peripheral surface 840a on the rotation direction R1 (the rotation direction of the holder 84(1) in normal rotation) side, but also at the inner peripheral surface 840a on the side opposite to the rotation direction R1, as illustrated in FIG. 9.

(2) As illustrated in, e.g., FIGS. 6A and 6B, the scraping portion 840b configured to scrape lubricant includes the plurality of raised portions 843 formed in the circumferential direction of the inner peripheral surface 840a of each pocket 840 in the region close to the outer ring side opening 840c. With the raised portions 843 of the scraping portion 840b formed in the region close to the outer ring side opening 840c, scraped lubricant effectively moves to the tapered surface 841. Moreover, since the region around the center portion of each rolling body 83 in the axial direction thereof contacts the rolling surfaces 81a, 82a of the outer and inner rings 81, 82, the raised portions 843 formed such that the raised portions 843 are aligned in the circumferential direction allow efficient scraping of lubricant adhering to the rolling body 83. Note that the shape of each scraping portion 840b is not limited to the configurations illustrated in FIGS. 6A to 8C, and various raised-recessed shapes are applicable.

(3) As illustrated in FIG. 9, a protrusion 845 may be formed on the tapered surface 841. In the example illustrated in FIG. 9, the protrusion 845 is formed at the end of the tapered surface 841 close to the wick 101. The protrusion 845 has inclined surfaces 845a, 845b, and includes a top 845c pointed toward the side (the lower end as viewed in the figure) closest to the wick 101. As indicated by, e.g., arrows D, the lubricant 90 scraped by the scraping portion 840b to adhere to the tapered surface 841 moves, by action of the centrifugal force, downward on the tapered surface 841, and then, moves up to the top 845c on the inclined surfaces 845a, 845b of the protrusion 845. Such lubricant adhering to the top 845c tends to be more scattered as compared to lubricant adhering to a surface. Note that the top 845c is pointed in the example illustrated in FIG. 9, but is not necessarily pointed.

The location where the protrusion 845 is formed is preferably the region to which lubricant scraped by the scraping portion 840b tends to be collected, and for example, may be the largest-diameter end region of the tapered surface 841 close to the scraping portion 840b.

(4) As illustrated in FIG. 5, the cylindrical tube member 104 as the lubricant guide portion is preferably provided, which is disposed on the outer peripheral side with respect to the outer peripheral surface of the holder 84(1) to contact the wick 101 and the outer ring 81 and which is configured to guide, to the wick 101, lubricant scattered from the tapered surface 841. With such a cylindrical tube member 104, it can be ensured that the lubricant scattered from the tapered surface 841 is collected by the wick 101. As a result, regardless of a pump orientation such as use of the pump in a landscape orientation or an inverted orientation, it can be ensured that lubricant is collected by the wick 101.

Figure 11A:
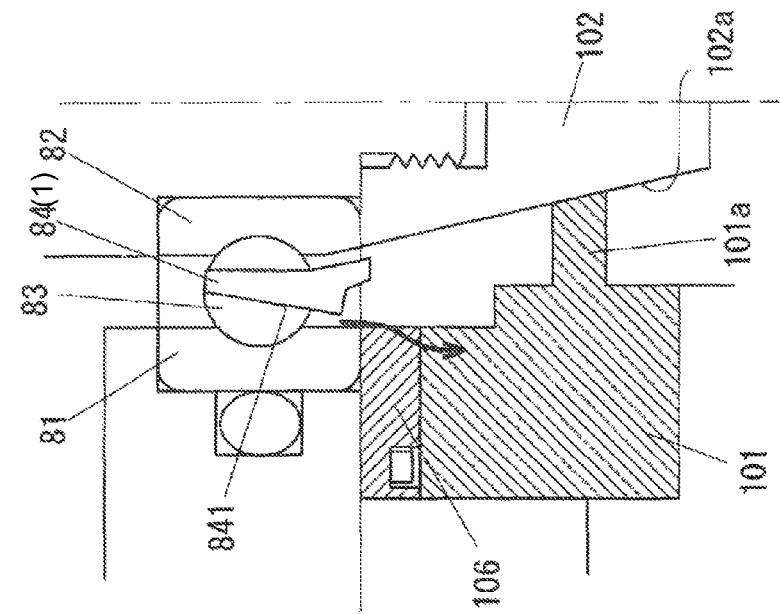
FIGS. 11A and 11B are views of other examples of a lubricant guide portion.
Figure 11B:
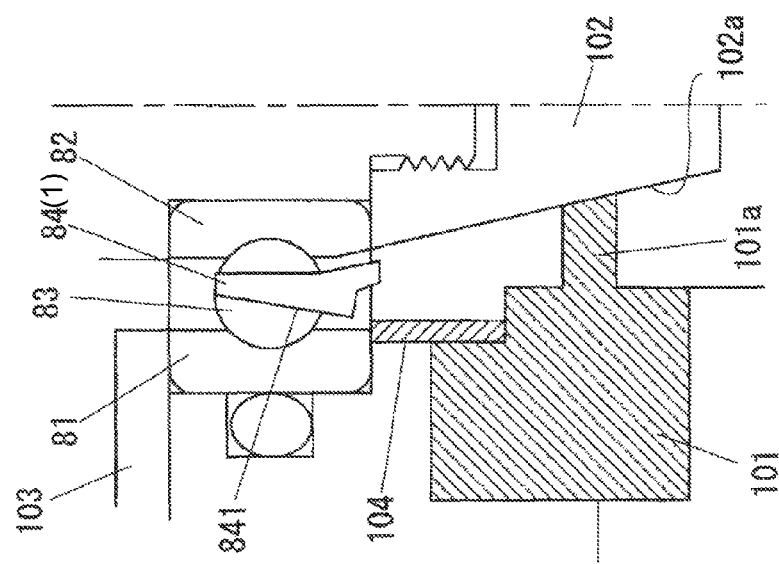

Note that in the cylindrical tube member 104 illustrated in FIG. 5 is configured to reach the inner peripheral surface of the outer ring 81. However, as illustrated in FIG. 11A, the cylindrical tube member 104 may be formed to contact the lower end surface of the outer ring 81 and the wick 101. Alternatively, as illustrated in FIG. 11B, a bearing weight 106 may be provided below the outer ring 81, and may be made of a porous material such as sintered metal. A metal plate subjected to porous electroplating may be used as the bearing weight 106. Lubricant is guided to the wick 101 by the porous electroplated layer.

Note that in the case of applying porous electroplating, the porous electroplated layer formed on a base interposed between the outer ring 81 and the wick 101 can be utilized as the lubricant guide portion in the configuration illustrated in FIG. 2.

Second Embodiment

In a bearing rotating at high speed, the moving speed of each rolling body is extremely high. Depending on conditions in such a state, the amount of lubricant splashed from a rolling surface of an inner ring by the rolling bodies might be greater than the amount of lubricant adhering to the rolling bodies. Centrifugal force acts on the rolling surface of the inner ring. Thus, particularly when the amount of lubricant is even slightly greater at the position near a groove end portion of the rolling surface, the above-described phenomenon tends to occur with passage of the rolling bodies as a trigger. When the lubricant splashed by the rolling bodies as described above adheres to the inner peripheral surface of an outer ring, there is a probability that the amount of lubricant on a rolling surface of the outer ring becomes excessive.

Figure 12:
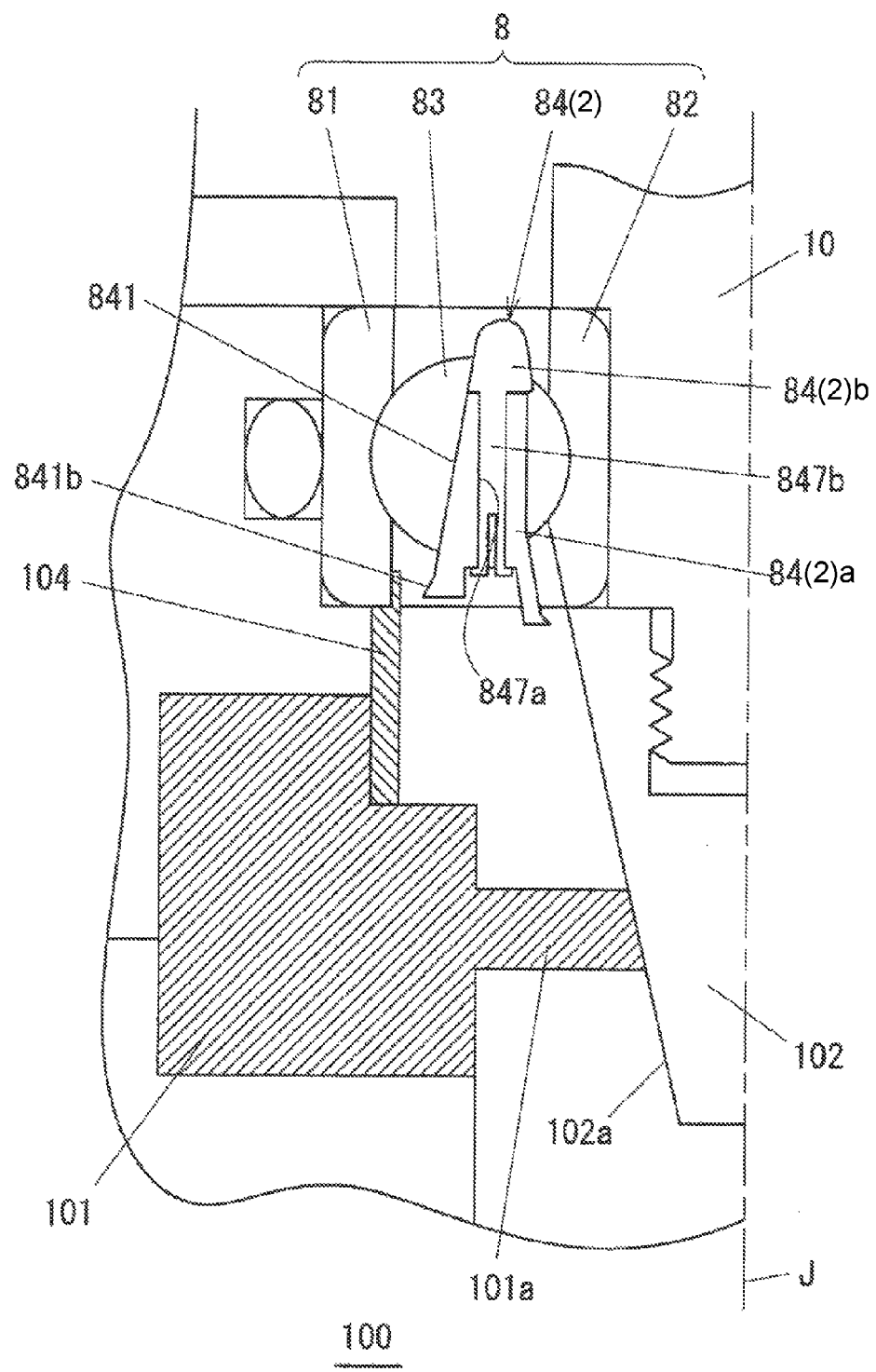
FIG. 12 is a view of an oil-lubricated bearing device of a second embodiment.

In a second embodiment, an oil-lubricated bearing device being able to effectively prevent excessive lubricant on the outer ring rolling surface due to such splashed lubricant will be described. FIG. 12 is a cross-sectional view of an oil-lubricated bearing device 100 in the second embodiment. FIG. 12 is the cross-sectional view of the part similar to FIG. 5 described above. The oil-lubricated bearing device 100 includes a ball bearing 8, a conical nut 102 formed with a tapered surface 102a, a wick 101 having a contact portion 101a, and a cylindrical tube member 104.

In the second embodiment, the conical nut 102, the wick 101, and the cylindrical tube member 104 have the same configurations as those of the corresponding members of the first embodiment described above. The second embodiment is different from the first embodiment in the configuration of a holder 84(2) of the ball bearing 8.

Figure 13:
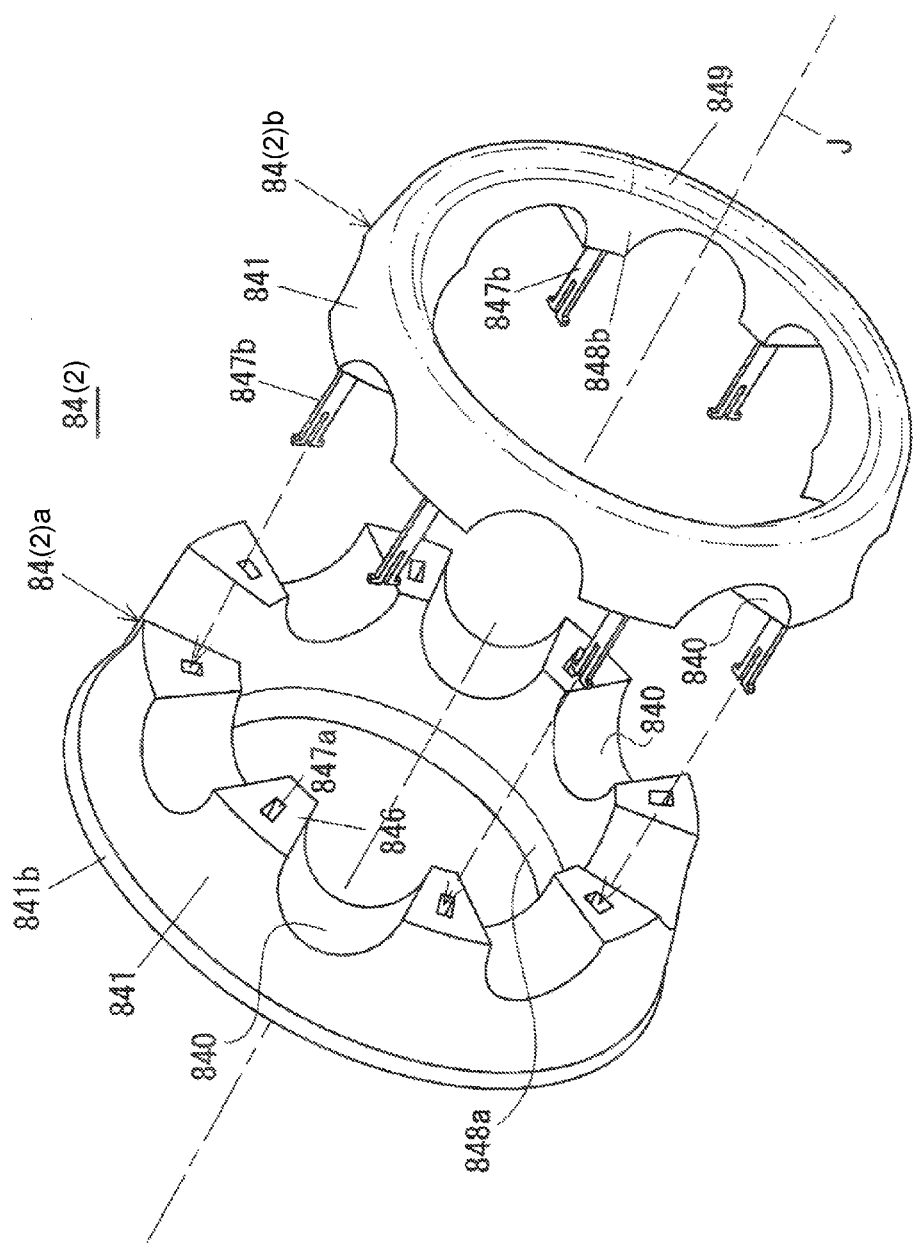
FIG. 13 is an exploded perspective view of a holder.

FIG. 13 is an exploded perspective view of the holder 84(2). The holder 84(2) is formed of two components (84(2)a, 84(2)b). Hereinafter, these two components will be referred to as a lower holder 84(2)a and an upper holder 84(2)b. The lower holder 84(2)a and the upper holder 84(2)b can be made of various types of materials, and are made of a synthetic resin material such as polyimide, for example.

One of two contacting surfaces of the lower and upper holders 84(2)a, 84(2)b is formed with a through-hole 847a, and the other surface is formed with a snap-fit coupling portion 847b. In the example illustrated in FIGS. 12 and 13, the through-hole 847a is formed at a contact surface 846 of the lower holder 84(2)a, and the coupling portion 847b is formed at a contact surface 846 (not shown in the figure) of the upper holder 84(2)b. The coupling portion 847b is coupled with the through-hole 847a such that the lower holder 84(2)a and the upper holder 84(2)b are integrated together.

In the example illustrated in FIGS. 12 and 13, the holder 84(2) is configured such that two members are integrally coupled together. However, the holder 84(2) may be formed of a single component or an integrated body of three or more coupled components. Moreover, a coupling structure is not limited to the snap-fit method as illustrated for the coupling portion 847b and the through-hole 847a, and various types of methods can be used.

Figure 14:
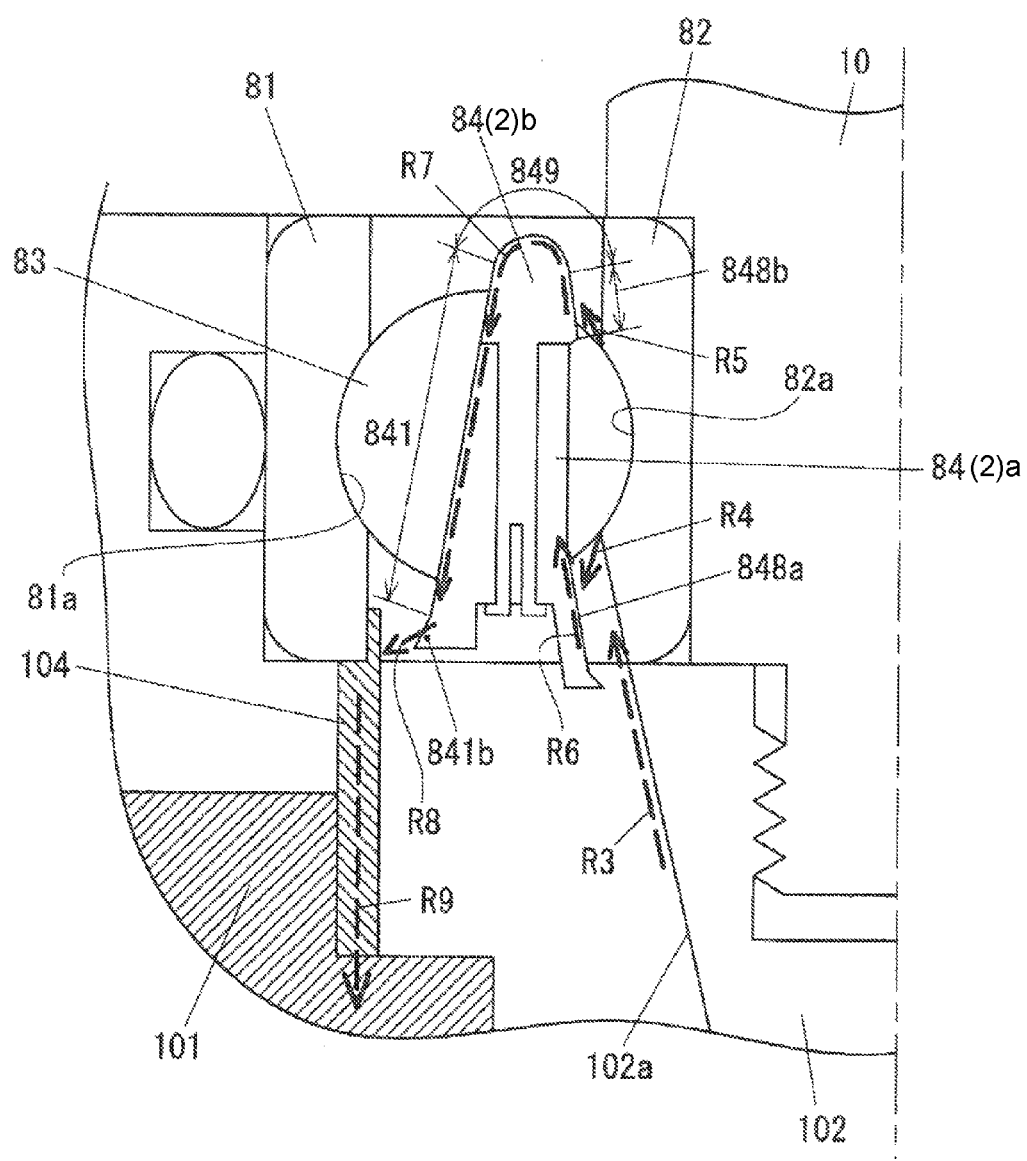
FIG. 14 is a view for describing a surface shape of the holder.

FIG. 14 is a view for describing the surface shape of the holder 84(2). The outer peripheral surface of the holder 84(2) facing an outer ring 81, i.e., the outer peripheral surface of the integrated body of the lower and upper holders 84(2)a, 84(2)b, forms a tapered surface 841 which is an inclined surface having a shape similar to that of the first embodiment. That is, the tapered surface 841 is an inclined surface rising with a slope toward the wick 101 such that the distance from the center axis J of the holder 84(2) increases toward the wick 101 as a lubricant storage. The lower end of the tapered surface 841 of the lower holder 84(2)a is formed with a ring-shaped protrusion 841b protruding outward from the tapered surface 841.

On the other hand, the inner peripheral surface of the holder 84(2) facing an inner ring 82, i.e., the inner peripheral surfaces of the lower and upper holders 84(2)a, 84(2)b, forms inclined surfaces (848a, 848b) falling with a slope toward the upper side as viewed in the figure such that the distance from the center axis J increases with distance from the wick 101 in the axial direction. In the example illustrated in FIG. 14, the inner peripheral surface of the lower holder 84(2)a forms the inclined surface 848a, and the inner peripheral surface of the upper holder 84(2)b forms the inclined surface 848b. Further, the holder end portion (the holder end portion on the upper side as viewed in FIG. 14) opposite to the wick 101 is formed with a curved connection surface 849 connecting between the tapered surface 841 and the inclined surface 848b.

Lubricant supplied from the wick 101 to the tapered surface 102a of the conical nut 102 moves, by action of the centrifugal force, toward the inner ring 82 on the tapered surface 102a as indicated by a dashed arrow R3 of FIG. 14. The lubricant having moved from the tapered surface 102a to the inner ring 82 moves onto a rolling surface 82a of the inner ring 82. The lubricant accumulated on the rolling surface 82a of the inner ring 82 is splashed by each rolling body 83 moving at high speed, and then, is scattered from the edge of the rolling surface 82a as indicated by arrows R4, R5. The scattered lubricant adheres to the inclined surfaces 848a, 848b formed by the inner peripheral surface of the holder 84(2) facing the inner ring 82.

Since the holder 84(2) and the rolling bodies 83 together rotate at high speed, the lubricant adhering to the inclined surface 848a moves, by action of the centrifugal force, upward as viewed in the figure in the direction in which the distance from the center axis increases. The moved lubricant adheres to the rolling bodies 83. Note that the inclined surface 848a of the lower holder 84(2)a is not necessarily formed. That is, in the case of no inclined surface 848a or a short inclined surface 848a, most of the lubricant scattered in the direction of the arrow R4 is scattered toward the wick 101, and therefore, there is no influence regarding excessive lubricant on the outer ring.

On the other hand, the lubricant adhering to the inclined surface 848b moves, by action of the centrifugal force, upward as viewed in the figure in the direction in which the distance from the center axis J increases, and then, moves from the inclined surface 848b to the connection surface 849 as indicated by an arrow R7. Since the connection surface 849 is connected to the tapered surface 841 formed by the outer peripheral surface of the holder 84(2), the lubricant on the connection surface 849 moves to the tapered surface 841 as indicated by the arrow R7.

The tapered surface 841 is the inclined surface rising with the slope toward the wick 101 such that the distance from the center axis J increases toward the wick 101. Thus, the lubricant on the tapered surface 841 moves, by the centrifugal force, downward as viewed in the figure in the direction in which the distance from the center axis J increases. The lubricant having reached the lower end of the tapered surface 841 is collected to the tip end of the protrusion 841b by the centrifugal force, and then, is scattered toward the outer ring as indicated by an arrow R8. The scattered lubricant returns to the wick 101 through the cylindrical tube member 104 as indicated by an arrow R9.

As described above, the lubricant scattered from the rolling surface 82a of the inner ring 82 is caught by the inclined surfaces 848a, 848b. In particular, there is a high probability that the lubricant scattered in the direction of the arrow R5 reaches and adheres to the outer ring 81 in the case where the upper holder 84(2)b is not attached and no lubricant is caught by the inclined surface 848b. In such a case, the lubricant on a rolling surface 81a of the outer ring 81 becomes excessive, leading to an increase in agitation resistance.

In the case of the present embodiment, the inclined surface 848b is connected to the tapered surface 841 through the connection surface 849, and therefore, the lubricant caught by the inclined surface 848b moves, by the centrifugal force, in the order of the inclined surface 848b, the connection surface 849, the tapered surface 841, the protrusion 841b, and the cylindrical tube member 104. As a result, the surface of the holder 84(2) can be utilized so that the lubricant scattered in the direction of R5 can return to the wick 101. As described above, in the present embodiment, excessive lubricant on the rolling surface 81a due to scattered lubricant can be prevented.

Note that in the present embodiment, the holder 84(2) is formed of two divided upper and lower components (the lower holder 84(2)a and the upper holder 84(2)b). Typically, in the case of a deep groove ball bearing, such a bearing can be assembled using such a divided structure. Needless to say, the holder 84(2) may be integrally formed. Particularly in the case of an angular contact ball bearing, such an integrated bearing can be easily assembled.

Figure 15:
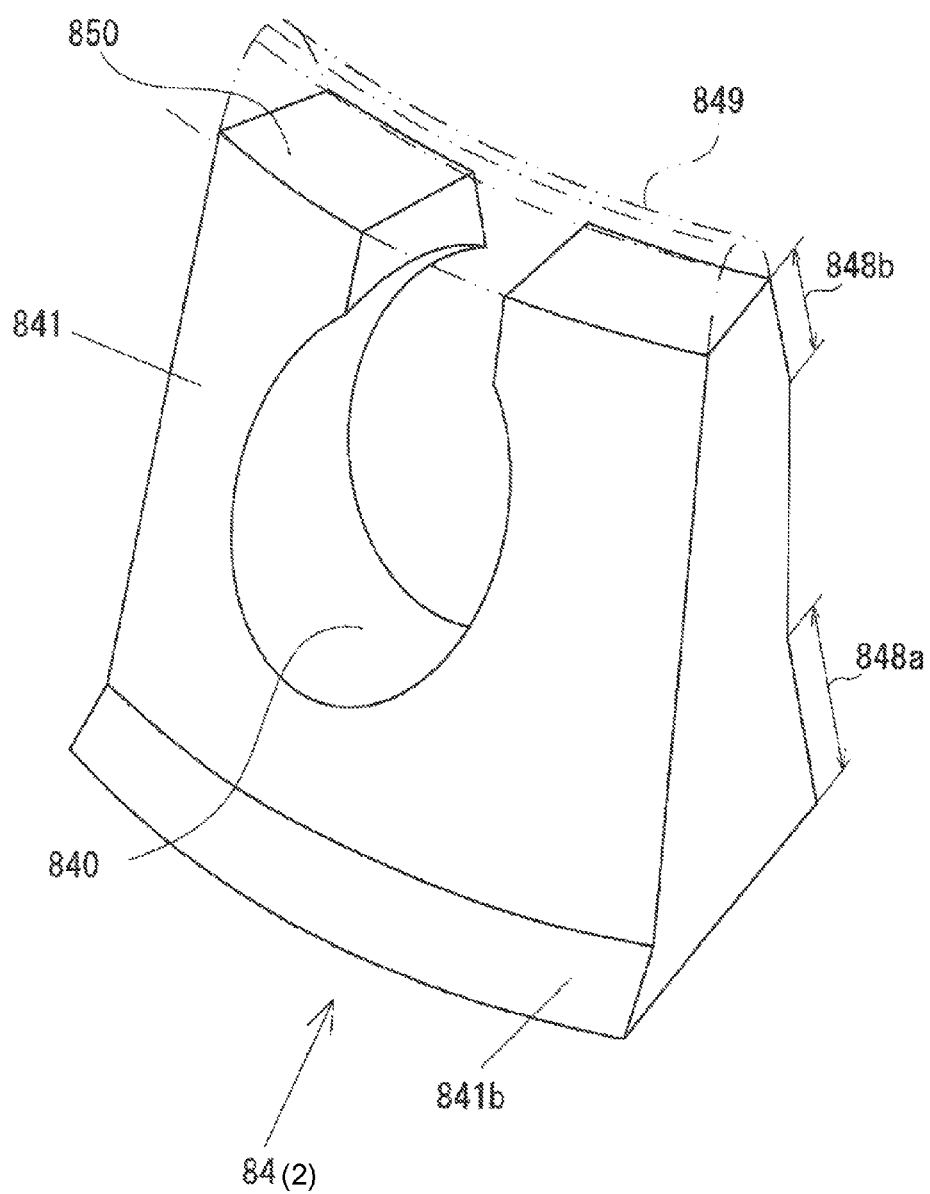
FIG. 15 is a view of the holder when a pocket opens on the upper side in the axial direction of the holder.

Moreover, even in the case where a pocket 840 forms a through-hole such that part of the holder 84(2) opens on the upper side in the axial direction as illustrated in FIG. 15, a similar structure is applicable. That is, the inner peripheral surface of the holder 84(2) forms the inclined surfaces 848a, 848b. A lower end portion of the tapered surface 841 is formed with the protrusion 841b. Note that a connection surface 850 formed at the upper end of the holder 84(2) is in a flat shape, and therefore, a connection portion between the connection surface 850 and each of the tapered surface 841 and the inclined surface 848b is in a pointed shape. With the pointed portion, lubricant tends to be collected to the pointed portion and be scattered from the pointed portion. Thus, such a portion is, as in the connection surface 849 indicated by a chain double-dashed line, preferably formed in a curved surface shape such that the connection surface 849 is smoothly connected to the tapered surface 841 and the inclined surface 848b. Note that in this figure, the connection surface 849 indicated by the chain double-dashed line is illustrated in a circular ring shape, but may be in such a shape that the opening of the pocket 840 remains. Lubricant passing through the opening cannot be caught, leading to a lower effect. However, a certain level of the effect of returning scattered lubricant can be expected.

(Variation)

Figure 16:
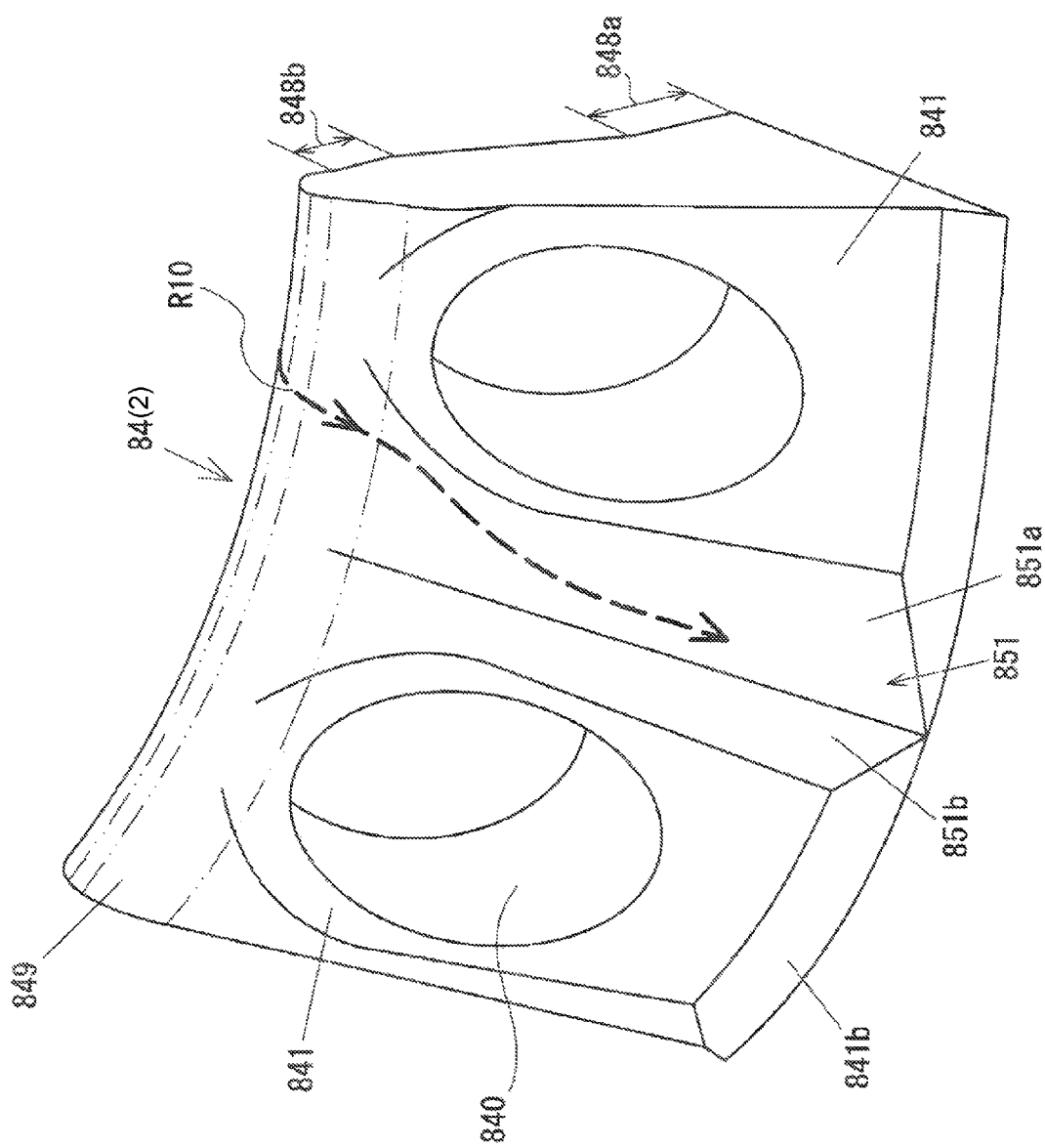
FIG. 16 is a view of a variation of the second embodiment.

FIG. 16 is a view of a variation of the second embodiment. In the second embodiment described above, the outer peripheral surface of the holder 84(2) forms the tapered surface 841, the inner peripheral surface of the holder 84(2) forms the inclined surfaces 848a, 848b, and the connection surface 849 connecting between the tapered surface 841 and the inclined surface 848b is formed. In the variation illustrated in FIG. 16, a protrusion 851 is further formed on the outer peripheral side tapered surface 841. The protrusion 851 is formed in a ridge shape to extend from the side of the connection surface 849 toward the end portion (the end portion formed with the protrusion) close to the wick 101.

In the case of the protrusion 851 illustrated in FIG. 16, the protrusion 851 is formed from the connection surface 849 to the protrusion 841b, but the length of the protrusion 851 in the axial direction may be shortened. Moreover, the protrusion 851 is in a raised shape with a pointed top formed by two intersecting inclined surfaces 851a, 851b, but may be in a raised shape with a gently-sloping top.

As indicated by a dashed arrow R10 of FIG. 16, lubricant having moved from the inner peripheral side inclined surface 848b to the outer peripheral side through the connection surface 849 moves from the connection surface 849 to the inclined surface 851a of the protrusion 851. This is because of the following reasons: the distance from the center axis J to the protrusion 851 is longer than the distance to the tapered surface 841, and therefore, greater centrifugal force acts on the lubricant. The lubricant on the inclined surface 851a moves, by the centrifugal force, toward the protrusion 841b while approaching the top of the protrusion 851. Eventually, the lubricant is scattered from the protrusion 841b toward the outer ring.

Thus, for the lubricant having moved from the inner peripheral side to the outer peripheral side of the holder 84(2), the probability that the lubricant re-adheres to the rolling body (not shown) in the pocket 840 is low. Most of the lubricant is scattered toward the outer ring through the protrusion 851, and then, returns to the wick 101 as indicated by the arrow R9 of FIG. 14. With the protrusion 851, the lubricant having guided to the outer peripheral side by the inclined surface 848b effectively returns, as described above, to the wick 101 without accumulating on the rolling surface 81a of the outer ring 81. Note that in the case of the holder shape illustrated in FIG. 15, similar advantageous effects can be also provided by the protrusion 851 provided on the outer peripheral side tapered surface 841.

As described above, in the second embodiment, the lubricant scattered from the rolling surface 82a of the inner ring 82 in the direction of the arrow R5 adheres to the inclined surface 848b formed by the inner peripheral holder surface, as illustrated in FIG. 14. Since the inclined surface 848b is the inclined surface falling with the slope such that the distance from the center axis J increases with distance from the wick 101 as the lubricant storage, the lubricant moves away from the wick 101 toward the connection surface 849. Since the connection surface 849 formed at the holder end portion opposite to the wick 101 connects between the tapered surface 841 formed by the outer peripheral holder surface and the inclined surface 848b, the lubricant having moved toward the connection surface 849 moves to the tapered surface 841 through the connection surface 849. Since the tapered surface 841 is the inclined surface rising with the slope such that the distance from the center axis J increases toward the wick 101, the lubricant having moved to the tapered surface 841 moves toward the wick 101 on the tapered surface 841, and then, is scattered from the wick side end portion (the lower end portion in the axial direction) of the tapered surface 841.

As described above, the lubricant scattered from the rolling surface 82a of the inner ring 82 and adhering to the inclined surface 848b is scattered from the wick side end portion of the outer peripheral side tapered surface 841. This prevents excessive lubricant on the rolling surface 81a of the outer ring 81.

Moreover, as illustrated in FIG. 16, the protrusion 851 is, on the tapered surface 841, formed in the ridge shape to extend from the connection surface 849 toward the wick 101 through the portion between adjacent two of the pockets 840. As a result, the lubricant having moved from the inner peripheral side inclined surface 848b to the tapered surface 841 moves toward the protrusion 851 by the centrifugal force, and then, moves to the wick side end portion along the ridge of the protrusion 851. This suppresses the lubricant from entering the outer ringside opening of the pocket 840 from the tapered surface 841.

Further, in FIG. 16, the pocket 840 penetrates from the inner ring side opening with surroundings thereof closed to the outer ring side opening with surroundings thereof closed. Thus, the strength of the holder is more improved as compared to the case of the pocket 840 opening on the upper side (the side opposite to the side on which the wick 101 is disposed) as illustrated in FIG. 15. Moreover, in the case where the pocket 840 opens on the upper side as illustrated in FIG. 15, there is a disadvantage that lubricant scattered to such an opening portion tends to reach the outer ring side. In the case of the closed pocket 840 as illustrated in FIG. 16, such lubricant scattering toward the outer ring side can be prevented. All of the pockets 840 do not necessarily penetrate from the inner ring side opening with surroundings thereof closed to the outer ring side opening with surroundings thereof closed, and some of the pockets 840 may open on the upper side. The number of opening pockets 840 is selected depending on the strength of the holder and the effect of preventing lubricant scattering.

Various embodiments and variations have been described above, but the present invention is not limited to the contents of theses embodiments and variations. For example, in the above-described embodiments, the turbo-molecular pump has been described as an example. However, the present invention is not limited to the turbo-molecular pump, and is applicable not only to oil-lubricated bearing devices of various vacuum pumps but also to oil-lubricated bearing devices of other devices than the vacuum pump. Other aspects conceivable within the scope of the technical idea of the present invention are included in the scope of the present invention.

What is claimed is:

1. An oil-lubricated bearing device comprising:
   a rolling bearing
      including an inner ring, an outer ring, rolling bodies, a holder configured to maintain a gap between adjacent ones of the rolling bodies and a lubricant storage disposed on a side provided with a tapered member with respect to the inner ring, and
      configured to support a rotor shaft;
   the tapered member provided at the rotor shaft to which the inner ring is fixed and formed with a first inclined surface rising with a slope toward the inner ring; and
   a contact portion configured to contact the first inclined surface to supply lubricant of the lubricant storage to the first inclined surface,
   wherein the holder includes
      pockets each formed with outer and inner ring side openings and configured to hold a corresponding one of the rolling bodies,
      a lubricant scraping portion formed at an inner peripheral surface of each of the pockets and configured to scrape lubricant adhering to a surface of each of the rolling body, and
      a second inclined surface formed at an outer peripheral surface portion of the holder adjacent to the outer ring side opening and rising with a slope toward the lubricant storage.

2. The oil-lubricated bearing device according to claim 1, wherein
   the lubricant scraping portion includes a plurality of raised portions formed in a circumferential direction of the inner peripheral surface of each of the pocket in a region close to the outer ring side opening such that the plurality of raised portions are aligned.

3. The oil-lubricated bearing device according to claim 1, wherein
   the second inclined surface is formed with a protrusion protruding from the second inclined surface.

4. The oil-lubricated bearing device according to claim 1, wherein
   the tapered member is an inner ring fixing member detachably provided at the rotor shaft and configured to fix the inner ring to the rotor shaft.

5. The oil-lubricated bearing device according to claim 1, further comprising:
   a lubricant guide portion disposed closer to the outer ring with respect to the holder to contact the lubricant storage and the outer ring and configured to guide lubricant scattered from the second inclined surface to the lubricant storage.

6. A vacuum pump comprising:
   the oil-lubricated bearing device according to claim 1; and
   a pump rotor provided with the rotor shaft.

7. An oil-lubricated bearing device comprising:
   a rolling bearing
      including an inner ring, an outer ring, rolling bodies, a holder configured to maintain a gap between adjacent ones of the rolling bodies and a lubricant storage disposed on a side provided with a tapered member with respect to the inner ring, and
      configured to support a rotor shaft;
   the tapered member provided at the rotor shaft to which the inner ring is fixed and formed with a first inclined surface rising with a slope toward the inner ring; and
   a contact portion configured to contact the first inclined surface to supply lubricant of the lubricant storage to the first inclined surface,
   wherein the holder includes
      pockets each penetrating from an inner peripheral holder surface to an outer peripheral holder surface and configured to hold a corresponding one of the rolling bodies,
      a second inclined surface formed by the outer peripheral holder surface and rising with a slope such that a distance from a center axis increases toward the lubricant storage,
      a third inclined surface formed by the inner peripheral holder surface and falling with a slope such that a distance from the center axis increases with distance from the lubricant storage, and
      a connection surface formed at a holder end portion opposite to the lubricant storage and connecting between the second and third inclined surfaces.

8. The oil-lubricated bearing device according to claim 7, wherein
   the second inclined surface is formed with a protrusion formed in a ridge shape to extend from a side of the connection surface toward the lubricant storage through a portion between adjacent two of the pockets.

9. The oil-lubricated bearing device according to claim 7, wherein
   at least one of the pockets penetrates from an inner ring side opening with surroundings thereof closed to an outer ring side opening with surroundings thereof closed.

10. The oil-lubricated bearing device according to claim 9, wherein
    the holder is configured such that two or more members are integrally coupled together.

11. A vacuum pump comprising:
    the oil-lubricated bearing device according to claim 7; and
    a pump rotor provided with the rotor shaft.

* * * * *